United States Patent [19]

Taumann

[11] 4,109,154

[45] Aug. 22, 1978

[54] X-RAY BEAM COMPENSATION

[75] Inventor: Leonhard Taumann, Lafayette, Calif.

[73] Assignee: Applied Radiation, Walnut Creek, Calif.

[21] Appl. No.: 779,025

[22] Filed: Mar. 18, 1977

[51] Int. Cl.[2] .................. G01J 1/00

[52] U.S. Cl. .................. 250/503; 250/505

[58] Field of Search .................. 250/398, 503, 505, 510, 250/493

[56] References Cited

U.S. PATENT DOCUMENTS

| | | | |
|---|---|---|---|
| 3,917,954 | 11/1975 | Boge | 250/505 |
| 3,969,629 | 7/1976 | McIntyre | 250/503 |
| 4,006,361 | 2/1977 | Schriber | 250/510 |
| 4,020,356 | 4/1977 | Brahme | 250/503 |

*Primary Examiner*—Alfred E. Smith
*Assistant Examiner*—B. C. Anderson
*Attorney, Agent, or Firm*—Hill, Gross, Simpson, Van Santen, Steadman, Chiara & Simpson

[57] ABSTRACT

In an electron accelerator having a target which is exposed to an electron beam for the production of x-ray deceleration radiation, a conical compensating member is arranged centrally within a cone pattern of the x-ray radiation. The compensating member has a decreasing conical shape toward the target and merges into a cylinder portion. Beam paths within the cylinder portion which are additional to those in a conventional purely conical compensating member are compensated by a recess positioned in a base of the compensating member having an appropriately selected depth. In another embodiment, a conically shaped compensating member is arranged within the cone-shaped x-ray pattern such that a tip of the compensating member is aligned away from the target and a base is aligned toward the target. A collimator having a conical passageway surrounding the x-ray radiation has a groove for receiving the base of the compensating member so as to mount the same within the conical passageway of the collimator.

9 Claims, 4 Drawing Figures

X-RAY BEAM COMPENSATION

BACKGROUND OF THE INVENTION

1. Field of the Invention

The invention relates to an electron accelerator comprising a target exposed to an electron beam for the production of x-ray deceleration radiation and also comprising a massive cone-shaped compensating member which is centrally arranged in the x-ray cone.

2. Description of the Prior Art

In the case of electron accelerators x-ray deceleration radiation is produced due to a deceleration of the electrons in a so-called target. It is known in the art to balance or compensate the dosage in a given space-angle range of the x-rays leaving the target by placing a compensating member into the portion of the x-ray cone of interest. This compensating member has a conical design. Its contour path is adpated to the path of the radiation intensity at the place of use. Since the dosage decreases very markedly with the distance from the center beam behind the target, the sides of the compensating member are correspondingly steep and the tip of the compensating member must be positioned very precisely with respect to the center beam.

In the case of a properly employed compensating member, the intensity distribution as indicated by broken line 36 in FIG. 1 and which would be assumed by the beam cone leaving the target at the location plane of a patient undergoing treatment would be changed flattened continuous line 37. The compensating member absorbs the overly intense radiation in the center as compared with the margins of a given beam cone. The portion of beam cone having the intensity distribution represented by the horizontal portion of curve 37 in FIG. 1 can be used for radiation purposes. It is a disadvantage, therefore, that, even for exact positioning, misadjustments of dose compensation can occur due to minor fluctuations of the direction of the electron beam leaving the accelerator.

In order to decrease the difficulties encountered by adjustment of the compensating member, it has been previously suggested to place the compensating member further away from the target in a range of the beam cone where the latter has already clearly widened. This, however, has the disadvantage that the compensating member is then arranged closer to the patient. Also, a portion of the beam which scatters unavoidably in the compensating member along with its source, has also been placed closer to the patient. Due to the square distance law, this causes an increased radiation stress for the patient even with a relatively low-energy beam component. Furthermore, due to the increase of the spacing between the compensating member and the target, the entire beam defining system becomes larger and heavier.

SUMMARY OF THE INVENTION

It is an object of this invention to provide a means of compensating the dosage distribution in the useful portions of the x-ray cone such that the alignment of the compensating member to the center beam is less critical.

In the case of an electron accelerator of this invention, the compensating member decreases conically. Its decreased portion merges into a cylinder such that the partial beam paths which are also in the cylinder portion of the compensating member (as compared with the purely conical embodiment) are compensated by a recess provided in the base of the compensating member having an appropriate local depth. It thus results that the end of the compensating member which is turned towards the radiation source is blunt and thus less sensitive to alignment errors. The portions with strong changes of the absorption values are placed into a plane perpendicular to the beam direction at a greater distance from the focal point and thus into an area where the beam cone has already widened to a greater extent.

A further reduction of the preciseness with which the compensating member must be aligned in the beam cone is obtained when, in a further development of the invention, the front surface of the cylindrical portion of the compensating member turned towards the target has its margins rounded and the outer portion of the recess is slightly distorted outwardly at the base of the compensating member in order to compensate the absorption. Thus, the alignment of the compensating member becomes less critical, including that range of the beam cone which corresponds to the margin of the upper frontal surface of the cylindrical portion.

DESCRIPTION OF THE PREFERRED EMBODIMENTS

Figure 1:
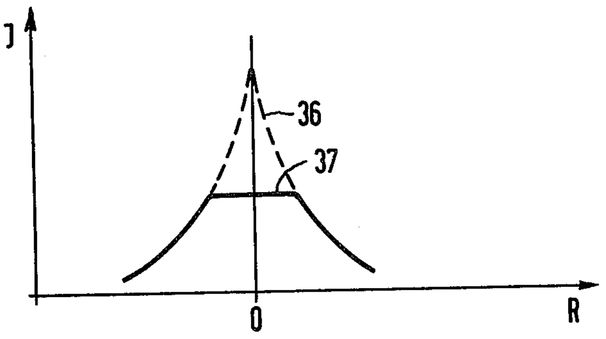
FIG. 1 is a diagram of the intensity distributions in the beam cone both with and without a compensating member.
Figure 2:
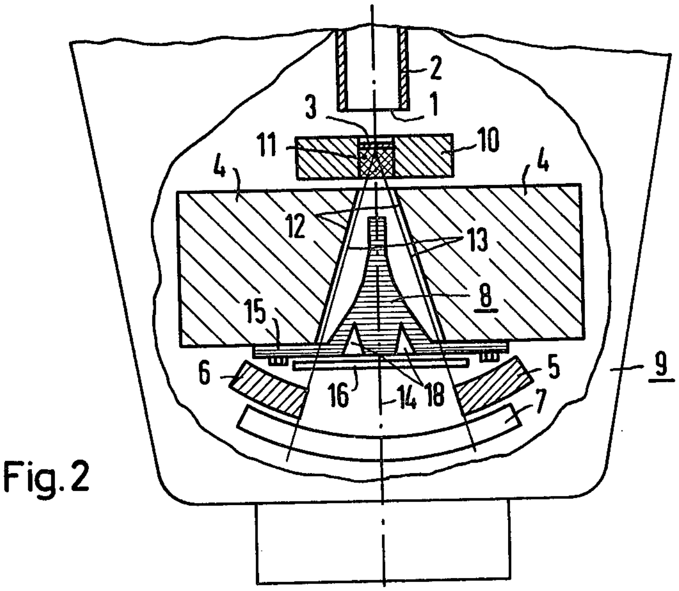
FIG. 2 is a schematic representation of a partially sectioned beam defining system comprising a target, a collimator, and a compensating member placed into the collimator.

FIG. 2 shows the locations of an exit window 1 of a vacuum tube 2 for the electron beam, a target 3, a collimator 4, adjustable x-ray shielding aperture plates 5, 6, 7, and the compensating member 8 in the partially sectioned beam defining system 9.

The target 3 is arranged in the beam direction directly behind the exit window 1 of the vacuum tube 2. It is positioned in a boring of a carrier plate 10. An electron absorption member 11 is positioned in this boring directly behind the target in the beam direction. The collimator 4 is positioned in the beam direction directly behind the carrier plate 10 for the target 3. Its conical passage opening 12 for the radiation has a diameter of a few mm more than the maximum useful portion of the radiation cone 13. It is aligned with respect to the center beam 14 of the beam cone 13. The x-ray shielding adjustable aperture plates 5, 6, 7 are arranged behind the collimator in the beam direction in order to adapt the width of the beam cone to the respective therapeutically required field magnitude. An ionization chamber 16 for supervising the exiting beam is arranged between collimator 4 and the x-ray adjustable screen plates 5, 6, 7. An iron plate 15 with the compensating member attached thereupon is screwed to the side of the collimator 4 which is turned away from the target 3.

Figure 3:
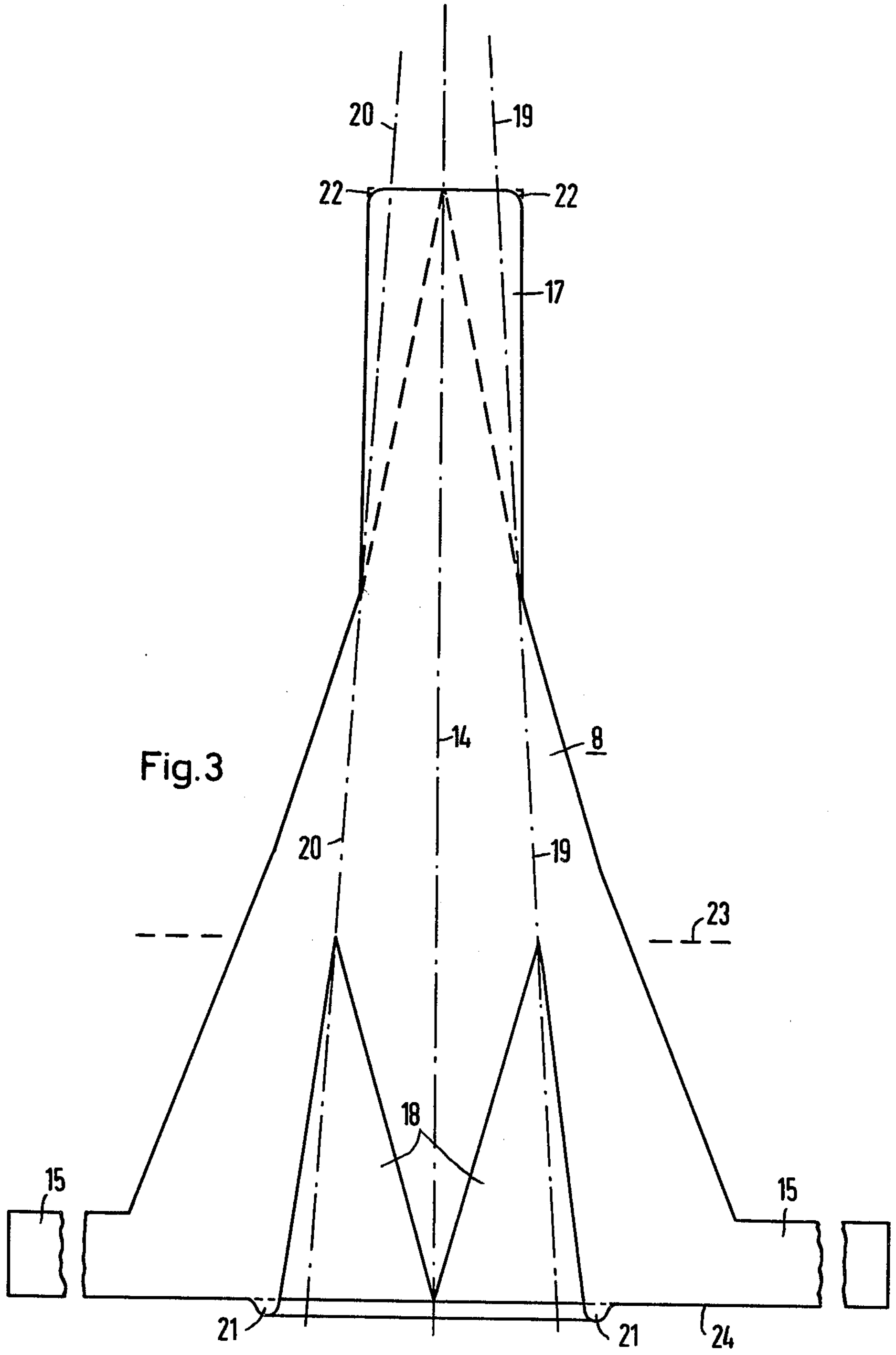
FIG. 3 shows an enlarged illustration of the compensating member of FIG. 1.

This compensating member 8 is shown enlarged in FIG. 3. It essentially comprises an increasingly more pointed conical member whose upper section (which usually merges into a tip shown as a broken line) has been replaced by a cylindrical portion 17. The margins of the frontal surfaces of the cylindrical sections which are turned towards the radiation sources are rounded. A ring-shaped recess 18 extending at an acute angle into the compensating member is positioned at the base of the compensating member. In FIG. 3, several selected beams 14, 19, 20 of the beam cone 13 are shown as broken lines. These selected beams reveal that the ring-shaped recess 18 is provided in such a way that it compensates those partial paths which represent x-rays leaving the target 3 divergently. These partial paths are positioned in the cylindrical section 17 of the compensating member 8 and are additional to those in a pointed compensating member. It thus results that the outer margin of the ring-shaped recess must have a bulge 21 in order to compensate the rounding 22 at the upper margin of the cylindrical portion.

During the alignment of the compensating member 8, plane 23, which is perpendicular to the center beam, is of importance since the ring-shaped recess 18 in the compensating member merges into an acute angle within this plane. This plane is spaced from the base 24 of the compensating member at a distance equal to the height of the cylindrical section 17. In the case of the present embodiment having a cylindrical section representing one-third of the entire height of the compensating member 8, this plane 23 is further remote from the target 3 by two-thirds of the height of the compensating member than in a conventional compensating member ending in a point. In this plane 23, the beam cone 13 is already widened to a larger extent so that the alignment becomes less critical to the same extent.

Figure 4:
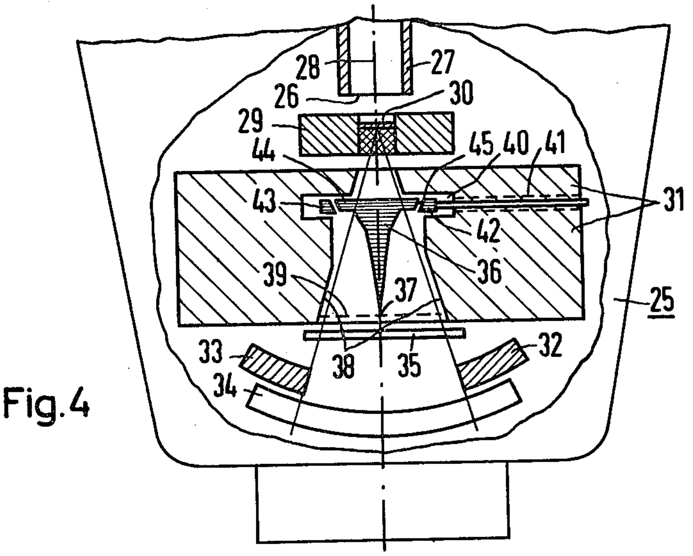
FIG. 4 is another embodiment of a compensating member in a beam defining system.

FIG. 4 shows another solution for the same problem. Here, the compensating member 36, which is otherwise provided in a manner known to a large extent in the prior art, is placed upside down, along with an otherwise identical embodiment of the beam defining system 25. The compensating member 36 is positioned in the passage opening of the collimator 31 with a tip 37 turned away from the target 30. Thus, the critical alignment plane 39 in the area of the tip 37 of the compensating member 36 is spaced over the full height of the compensating member 36 away from the target 30. In the case of this arrangement, a pointed compensating member 36 can be used without a ring groove milled into the base. When the compensating member is rotated 180°, due to the divergence of the radiation all sides of the compensating member 25 must be provided more steeply at twice the angle of the beam divergence. In order to attach the compensating member 36 within the collimator 31, a conical passage opening 38 has a cylindrical portion in the center range of the collimator. This cylindrical portion has at its upper end a ring groove 40 of a larger diameter. This ring groove is thus arranged in a plane perpendicular to the symmetrical axis of the collimator 31 which coincides with the center beam 28. In this ring groove 40 clamping jaws 42, 43 are arranged which can be adjusted via screw threads 41 (only one is shown) and which are displaced from one another by 120°. A carrier plate 44 which is connected with the base of the compensating member 36 can be mounted between these clamping jaws 42, 43. The margin of the carrier plate 44 is conically inclined into an angle of 45° in the direction towards the tip of the compensating member. The clamping surfaces of the clamping jaws 42, 43 are adapted to meet with this inclination.

Although various minor modifications may be suggested by those versed in the art, it should be understood that it is intended to embody within the scope of the patent warranted hereon, all such embodiments as reasonably and properly come within the scope of this contribution to the art.

I claim:

1. An electron accelerator comprising:

(a) an electron beam;

(b) a target means exposed to the electron beam for producing x-ray deceleration radiation in the shape of a cone;

(c) a massive conical compensating means for flattening the radiation intensity distribution arranged centrally in the cone of the x-ray radiation, said compensating means having a decreasing conical shape towards the target means, and a base away from the target means;

(d) said decreasing conical shape merging into a cylindrical portion having a frontal surface adjacent the target means; and (e) a recess means positioned adjacent the base of the compensating means and having a given depth for compensating portions of the x-ray radiation in the cylindrical portion outwardly from the center of the radiation cone, said portions being those portions of the x-ray radiation intercepted by the cylindrical portion which are additional to those portions intercepted in a conical embodiment of the compensating means.

2. An electron accelerator in accordance with claim 1, characterized in that the frontal surface of the cylindrical portion of the compensating means which is turned towards the target has margins which are rounded, and an outer edge of the recess means protrudes slightly outwardly at the base of the compensating means for compensating absorption.

3. An electron accelerator in accordance with claim 1, characterized in that the cylindrical portion extends over approximately one-third of the overall compensating means height.

4. An electron accelerator in accordance with claim 1 in which the compensating means is made of stainless steel.

5. An electron accelerator in accordance with claim 1 in which the compensating means comprises several sections with differing side inclinations, the inclinations being steeper with increasing distance from the base.

6. An electron accelerator comprising:

(a) an electron beam;

(b) a target means exposed to the electron beam for producing x-ray deceleration radiation in the shape of a cone, and a collimator having a conical passageway with a cylindrical portion for the radiation;

(c) a conical compensating means for flattening the radiation intensity distribution arranged centrally in the cone of the x-ray radiation, said compensating means having a tip aligned away from the target and a widened carrier portion aligned toward the target;

(d) said collimator cylindrical portion having a groove means for receiving the widened carrier portion of the compensating means and mounting means for engaging the carrier portion of the compensating means within the groove means; and (e) said compensating means having several sections with different side inclinations, the inclinations being steeper with increasing distance from the carrier portion.

7. An electron accelerator in accordance with claim 6, characterized in that the compensating means is made of stainless steel.

8. The accelerator of claim 6 in which the mounting means comprise adjustable clamping members.

9. The accelerator of claim 8 in which the clamping members have inclined surfaces which abut inclined surfaces on the carrier portion.

* * * * *